United States Patent [19]

Swan

[11] Patent Number: 5,258,960

[45] Date of Patent: Nov. 2, 1993

[54] SEISMIC VELOCITY ESTIMATION METHOD

[75] Inventor: Herbert W. Swan, Dallas, Tex.

[73] Assignee: Atlantic Richfield Company, Los Angeles, Calif.

[21] Appl. No.: 982,524

[22] Filed: Nov. 27, 1992

[51] Int. Cl.[5] .............................................. G01V 1/28
[52] U.S. Cl. .......................................... 367/38; 367/47
[58] Field of Search ........................ 367/38, 47, 52, 59

[56] References Cited

U.S. PATENT DOCUMENTS 4,570,246 2/1986 Herkenhoff et al. ................. 367/68
4,995,007 2/1991 Corcoran et al. ..................... 367/52

OTHER PUBLICATIONS

"Complex Seismic Trace Analysis", M. T. Taner, F. Koehler, and R. E. Sheriff; Geophysics, vol. 44, No. 6 (Jun. 1979) pp. 1041-1063.

Herbert W. Swan, "Amplitude-versus-offset measurement errors in a finely layered medium", Geophysics, vol. 56, No. 1, (Jan. 1991; pp. 41-49.

*Primary Examiner*—Ian J. Lobo
*Attorney, Agent, or Firm*—Albert C. Metrailer

[57] ABSTRACT

A method for detecting errors in estimated seismic velocities used in a normal moveout correction of a gather of traces selected from conventional, common midpoint seismic data. Zero offset reflectivity and amplitude versus offset slope traces are derived from the NMO corrected gather. Analytic traces are calculated for the zero offset reflectivity and amplitude versus offset slope traces. The analytic zero offset reflectivity trace is multiplied by the complex conjugate of the analytic slope trace and the imaginary part of the product indicates estimated velocity errors. The velocity error indicator is used to correct the velocity estimates so that the normal moveout process may be reperformed without the errors caused by incorrect velocity estimates. Alternatively, the velocity error indicator itself is plotted on a seismic section as an indicator of characteristics of subsurface earth formations.

4 Claims, 3 Drawing Sheets

Moved out gather with a small velocity error

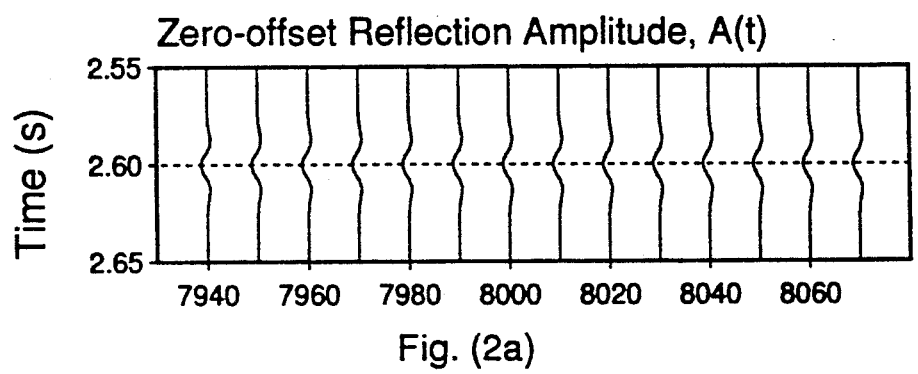
Fig. (2a)
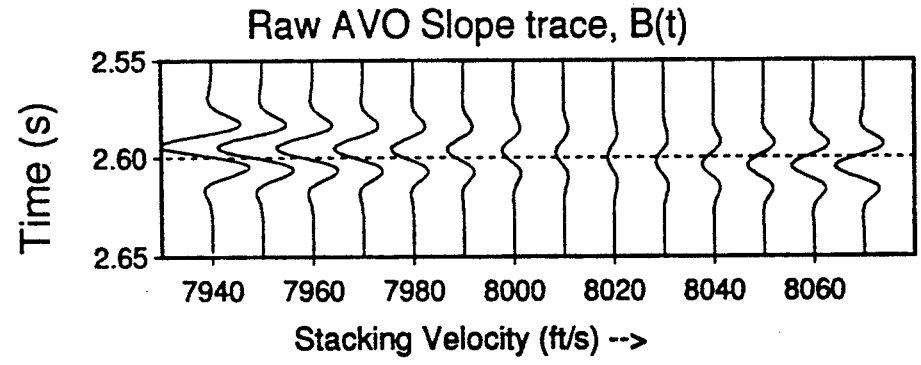
Fig. (2b)

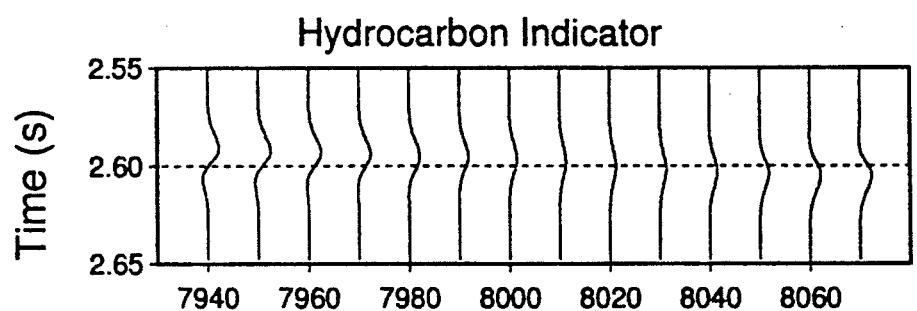
Fig. (3a)
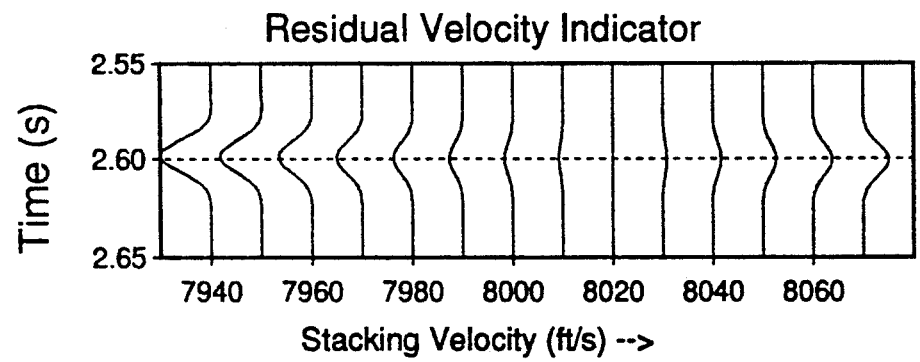
Fig. (3b)

SEISMIC VELOCITY ESTIMATION METHOD

BACKGROUND OF THE INVENTION

This invention relates to an improved method of estimating seismic velocities for use in generating seismic sections indicating valuable characteristics of subsurface earth formations, and more particularly, to a method in which amplitude versus offset analysis is used to precisely correct velocity estimates made by prior known methods.

Modern seismic prospecting techniques normally employ the common depth point, CDP, or common midpoint, CMP, techniques to improve signal-to-noise ratio. In these methods, seismic signals are generated sequentially at each of a number of points along a seismic prospecting path while reflections are recorded at all of the points following generation of each signal. The recorded signals are then organized into gathers of traces each corresponding to a common depth point or common midpoint. That is, all of the signals in a gather occur from source receiver pairs equally spaced about the point in question along the prospect path. The basic purpose of this exploration technique is to allow the signals within each gather to be combined to improve signal to noise ratio. However, due to the different path lengths involved in each source receiver pair, corrections must be made to the individual traces within the gather to place them in alignment before stacking. These corrections, known as normal moveout, NMO, corrections depend primarily on estimated velocities of the earth formations through which the signals passed. Errors in the velocity estimation result in errors in the alignment of the signals and thereby reduce the signal to noise ratio of the resulting stacked signal.

The classical normal moveout correction method depends on the maximization of normalized stack power to obtain what appears to be the best fit. These techniques are generally referred to as semblance methods. The use of the semblance methods and further improvements thereto are discussed in U.S. Pat. No. 4,570,246 issued to Herkenhoff, et al., Feb.11, 1986, which patent is hereby incorporated by reference for all purposes.

In addition to improving signal to noise ratio in conventional amplitude traces, the CDP method of exploration allows estimation of various characteristics of subsurface formations which can be used to predict the hydrocarbon bearing potential thereof. This can be done through the amplitude versus offset, AVO, technique in which the variation in amplitude of signals reflected from given subsurface interfaces is analyzed for changes relating to the angle of incidence or offset between source and receiver pairs. In order to properly perform such analysis, all other sources of amplitude variation should be removed first. For example, the very fact that the signal path length is greater for greater offset pairs naturally reduces signal levels. Path length estimates are in turn effected by estimated seismic velocities. Slight errors in estimated seismic velocities can generate erroneous amplitude changes with offset which are greater than the actual variations resulting from the change in angle of incidence.

SUMMARY OF THE INVENTION

In accordance with the present invention, I have discovered that amplitude versus offset analysis of seismic signals can be used to very precisely identify errors in seismic velocity estimations made by previous methods, which are used to perform the amplitude versus offset analysis itself. In the present invention, data collected in a CDP survey are organized into gathers of traces having common midpoints. Each gather then undergoes a normal moveout correction using conventional velocity estimation methods such as semblance. A zero offset reflectivity trace and an amplitude versus offset slope trace are then generated from the corrected gathers. An analytic trace is then generated for each of the zero offset reflectivity and amplitude versus offset slope traces. The complex conjugate of the analytic slope trace is then generated and multiplied by the analytic zero offset reflectivity trace. The imaginary part of the resulting product very precisely indicates errors in the estimated velocities used in the normal moveout correction step. In one embodiment of the invention, the error indicator is used to make one correction to the velocity estimate allowing the normal moveout correction to be re-performed with essentially no error due to incorrect velocity estimates. In an alternative embodiment, the velocity error indicator itself is plotted on a seismic section as a direct indicator of subsurface formation characteristics.

DESCRIPTION OF THE DRAWINGS

The present invention may be better understood by reading the following detailed description of the preferred embodiments with reference to the accompanying drawings wherein:

FIGS. 2(a) and 2(b) illustrates the difference in errors caused in plotted reflection amplitude and AVO slope trace curves resulting from errors in estimated seismic velocities; and, FIGS. 3(a) and 3(b) illustrates the sensitivity of the velocity error indicator of the present invention to errors in estimated velocity.

DESCRIPTION OF THE PREFERRED EMBODIMENTS

Figure 1:
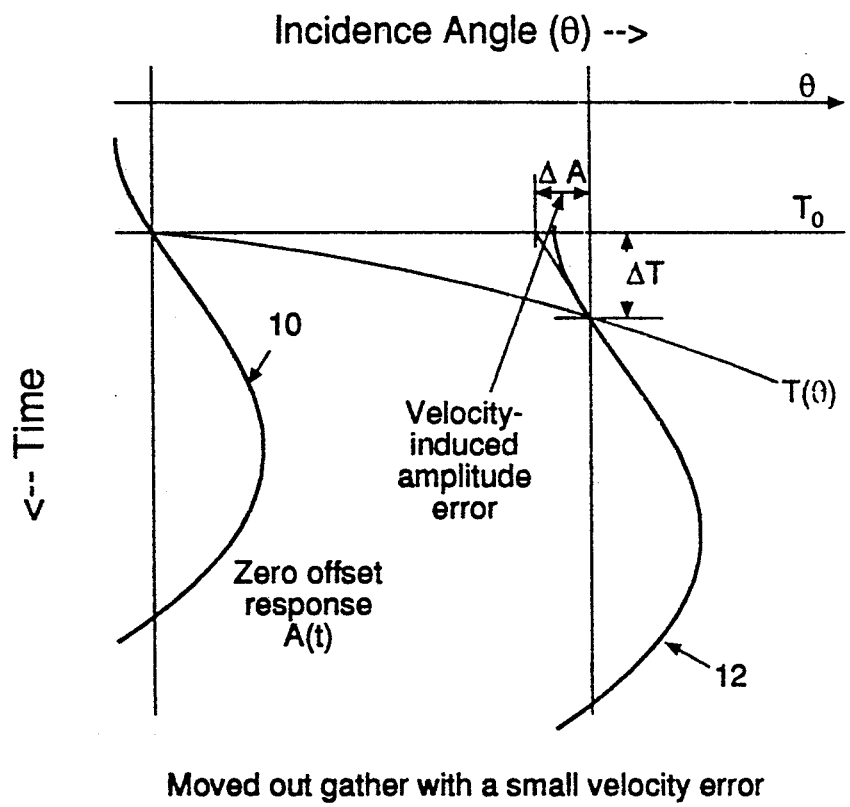
FIG. 1 is an illustration of the cause of errors in AVO analysis resulting from errors in estimated seismic velocities.

One of the difficulties in performing AVO analysis is obtaining precise stacking velocity measurements. Errors in estimated velocity which are too small to make a significant difference for conventional stacking can generate erroneous AVO variations which are several times larger than the actual AVO variations being sought. This effect can be illustrated by reference to FIG. 1 which assumes that there is actually no AVO variation in the data, but only a small error in the estimated seismic velocity used in the NMO process. That is, the two traces 10 and 12 should have the same amplitude and should cross the vertical axis at time $T_0$. However, the erroneous velocity estimation has resulted in a roughly parabolic deviation, $\Delta T$, from the zero-offset time $T_0$ for trace 12. For incidence angles, $\theta < 40°$, this deviation is roughly proportional to the fractional stacking velocity error, $\Delta V/V$, and to $\sin^2\theta$. The resulting amount of amplitude variation error, $\Delta A$, is given by $\Delta T$ multiplied by the time derivative of the zero-offset seismic data, $A'(t)$. This amplitude variation is proportional to $A'(t)$ and to $\sin^2\theta$. This angle dependency is precisely what is sought in AVO analysis, since reflection coefficients also change in proportion to $\sin^2\theta$. The true AVO slope, $B(t)$, is defined to be the coefficient of sin²θ in the angular dependent reflection coefficient R as follows:

$$R(\theta,t) = A(t) + B(t)\sin^2\theta$$

Thus, the velocity-induced slope error is proportional to the derivative of the zero-offset data.

Seismic data as the zero-offset response A(t) was first represented by Taner et al. as the product of a relatively slowly modulating signal, $A_m(t)$, times a higher frequency carrier, $\cos(\omega t + \phi)$, where $\omega$ is the dominant seismic frequency and $\phi$ is its phase. See the publication by Taner, et al. "Complex seismic trace analysis", Geophysics, Vol. 44, No. 6, June 1979, pages 1041–63. The same data can be represented as the real part of a complex analytic trace, $A_c(t) = A_m(t)e^{i(\omega t + \phi)}$. Under the slow variation restriction on $A_m(t)$, the real and imaginary parts of the analytic trace are Hilbert transforms of each other. The contribution to slope from a velocity error is proportional to A'(t), which is approximately equal to the real part of $i\omega A_c(t)$, where $i = \sqrt{-1}$.

The true AVO slope, B(t), is the real part of its analytic representation, $B_c(t) = B_m(t)e^{i(\omega t + \phi)}$. However, it is contaminated by velocity errors such as that illustrated in FIG. 1. According to the present invention, the affects of velocity error estimation can be separated from true AVO affects which indicate lithology changes and fluid content by forming the product $A_c(t)$ times the complex conjugate of the analytic raw slope, $B_{raw}$, formed by performing a least-squares fit of ampitudes at every instant of time across the moved-out CDP Gather, the semblance method, and using the Hilbert transform to gets it imaginary part:

$$A_c(t)B_{raw}^*(t) = A_c(t)[B_c(t) + iKA_c(t)]^*$$
$$= A_m(t)B_m(t) - iKA^2m(t)$$
$$\text{Real} \quad\quad \text{Imaginary}$$

An important feature of this complex product is that it is independent of the phase $\phi$ of the original data, making the calibration between actual and synthetic data from well logs less critical. The imaginary part of the product is a velocity error indicator which may be used several ways as discussed below. The scale factor, $K = \omega T_0 \Delta V/V$, may be used to quantify the magnitude of this indicator if $|\Delta V/V| < 0.02$.

FIG. 2 provides a synthetic example of these concepts. Conventional AVO analysis was performed on a single reflection event, having true reflection coefficient A = B = −0.05. The raw measured reflection coefficients, A(t) and B(t) are shown in FIG. 2. Holding the spatial position constant, the estimated stacking velocity was varied over the range shown, while the "true" velocity was 8020 feet per second. The variation introduced a distortion in the AVO slope of at least eight times the correct answer for the presumed 30 Hz Ricker wavelet, but no noticeable error in the zero-offset amplitude A(t). Noticeable distortions in slope arise from velocity errors as small at 0.2%.

The real part of the product from Equation 3 above is referred to the hydrocarbon indicator (HCI) and normally plotted on or as a seismic section as an indicator of hydrocarbons resulting from AVO analysis. FIG. 3A illustrates the HCI resulting from such analysis of the synthetic data illustrated in FIG. 2. The correct HCI is therefore the trace appearing at 8020 feet per second in FIG. 3A. At the other estimated velocities considerable errors occur in the HCI as a result of the errors in estimated velocities. FIG. 3B illustrates corresponding velocity error indications resulting from plotting the imaginary part of the product from Equation 3. Since in the synthetic example the actual velocity is 8020, the indicator is flat at this stacking velocity. As illustrated, any deviations from the true velocity are quite apparent from the remaining traces. I have found that the velocity error indicator is able to resolve velocity errors as low as 0.1% on well separated events with noise free data.

After thus processing actual data to determine the velocity error indicator such as illustrated in FIG. 3b, the error indications may be used in several ways. As indicated above, if the conventional velocity estimation method results in velocity estimates within about 2% of the correct velocity, the velocity error indicator can be used to make a single step correction to the estimated velocity and the NMO process may be re-performed to stack the data gathers with essentially no errors resulting from velocity estimation. The process described herein for detecting velocity errors may be re-performed at that point to confirm that the correct velocity has been used on the second NMO process. If errors are still present, it will indicate that the original estimates contained errors greater than 2% and the process will have to be reperformed.

Alternatively, the velocity error indicator may be plotted on a seismic section as an indicator of characteristics of subsurface formations. Thus, the indicator may be converted to color scale and plotted on a conventional seismic section or on a section using the hydrocarbon indicator trace such as shown in FIG. 3A. Such a plot highlights subsurface areas which have velocities different from those estimated by traditional techniques. Such differences are often caused by the presence of hydrocarbons. Thus, the plot of the velocity error indicator itself can show the presence of hydrocarbons when other forms of seismic sections provide no such indication.

In addition to errors caused by incorrect velocity estimates in the NMO process, I have found that the NMO corrections distort the shape of the seismic response, broadening it as the offset increases. This distortion, known as NMO stretch, introduces a predictable error in the AVO slope, which can be modeled as the zero offset response convolved with a modified seismic wavelet. Since this NMO stretch introduces additional errors in the process, it is preferred that a stretch correction be made to the AVO slope trace before measuring the velocity estimation errors as discussed above.

To correct NMO stretch it is first necessary to provide an approximation of the seismic wavelet. This wavelet is the shape of the reflected seismic energy from a single, isolated rock interface. If an approximate wavelet is not available from the particular data in question, the method will work if one assumes a Ricker wavelet of an appropriate center frequency. The AVO slope error due to NMO stretch can be expressed as the zero offset reflection response convolved with a distortion wavelet, then multiplied by a scaling function. The distortion wavelet can be expressed as the time derivative of the actual or assumed seismic wavelet, divided by two and multiplied by time. The scaling function can be expressed as unity plus two times the two-way zero offset reflection travel time multiplied by the fractional change in stacking velocity with time.

In performing the NMO stretch correction it is necessary to design digital filters, for example, by use of a Levison inversion, which do the following:

(1) Estimate the underlying zero offset response and AVO slope, given estimates of these quantities which have been corrupted by random noise; and (2) Estimate the zero offset response convolved with the distortion wavelet, given an estimate of the zero offset response which has been corrupted by random noise.

This inversion is carried out in terms of the autocorrelation matrices of the noise and the seismic wavelet, and in terms of the cross correlation matrix of the seismic wavelet with the distortion wavelet. The coefficients of the latter matrices can be explicitly expressed for the case of a Ricker wavelet or derived empirically for other wavelets.

In performing the NMO correction, the measured zero offset response and the AVO slope, both of which are noise corrupted, are convolved by Filter No. 1, to yield the filtered zero offset and slope estimates. The measured zero offset response is then also convolved with Filter No. 2, and then multiplied by the scaling function, to yield an estimate of the NMO stretch distortion. The stretch corrected slope estimate is obtained by subtracting the estimated stretch distortion from the filtered slope estimate.

While the present invention has been illustrated and described with reference to a particular method of operation, it is apparent that various changes may be made therein within the scope of the appended claims.

What is claimed is:

1. A method for estimating seismic velocity errors comprising:
    performing seismic observations along a surface line to obtain common midpoint seismic data;
    selecting a gather of traces having a common midpoint;
    performing a normal moveout correction of the gather of traces using a conventional velocity estimation method, such as semblance;
    calculating a zero offset reflectivity trace and an amplitude versus offset slope trace from the corrected gather;
    calculating analytic traces for each of the zero offset reflectivity and amplitude versus offset slope traces;
    multiplying the analytic zero offset reflectivity trace by the complex conjugate of the analytic slope trace, wherein the imaginary part of the product is an indicator of velocity errors.

2. A method according to claim 1, further including the step of using the velocity error indicator to correct the velocity estimated by the conventional velocity estimation method.

3. A method according to claim 2, further including the step of performing a second moveout correction of the gather of traces using the corrected velocity estimate.

4. A method according to claim 1, further including the step of plotting the velocity error indicator on a seismic section as an indicator of characteristics of subsurface earth formations. indicator of characteristics of subsurface earth formations.

* * * * *